Nov. 14, 1933.     I. R. ROBISON     1,934,950
END THRUST FACING AND FILLET CUTTER
Filed Jan. 15, 1931
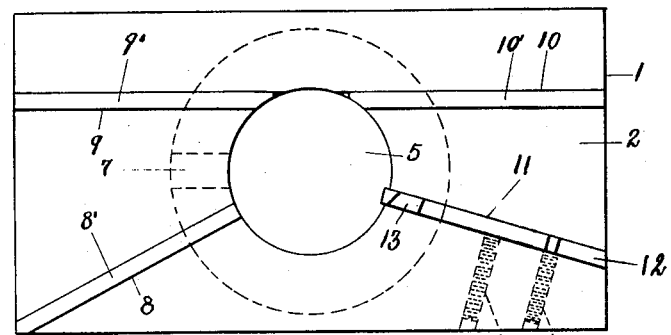
Fig. I
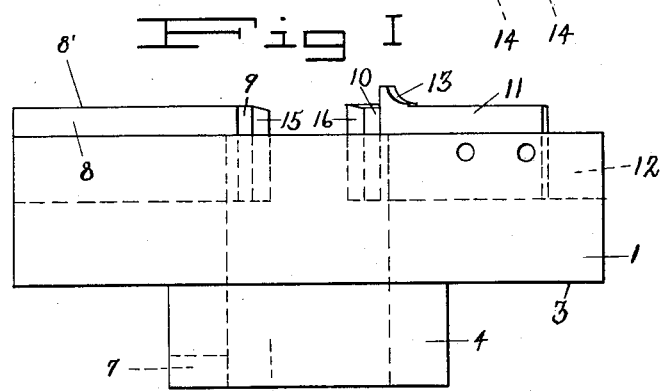
Fig. II
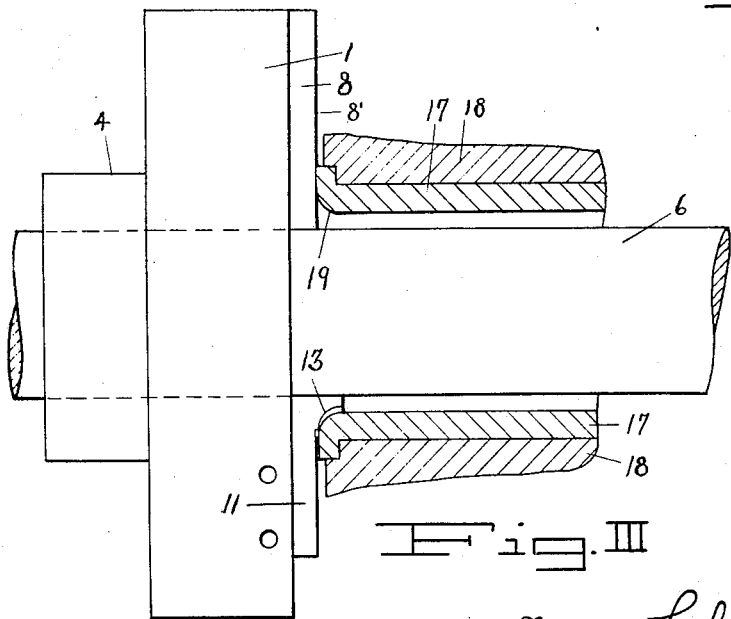
Fig. III
Inventor
Isaac R. Robison
By Clive Hartson
His Attorney Patented Nov. 14, 1933

1,934,950

UNITED STATES PATENT OFFICE 1,934,950

END-THRUST FACING AND FILLET CUTTER

Isaac R. Robison, Ione, Oreg.

Application January 15, 1931. Serial No. 508,936

3 Claims. (Cl. 82—1)

The present invention has to do with tools designed for machining and finishing bearings, especially the main and connecting rod bearings of internal combustion engines. Its peculiar function is to provide such bearings with a suitable end-thrust facing.

The tool comprises a cutter head designed to be mounted upon a cutter shaft of the character described in a previous invention of mine, evidenced by U. S. Patent No. 1,740,836, issued December 24, 1929, and entitled a "Bearing aligning tool."

This head is provided with suitable blades for facing the ends of the bearings to provide a suitable end-thrust face. Heretofore, devices of this character have had one serious fault and that has been a pronounced tendency to chatter and to make chatter marks on the end face of the bearings. This fault, most pronounced in cutters provided with radial blades equally spaced from one another, has been partially overcome by arranging such blades at irregular distances from one another. This last arrangement has not proven entirely satisfactory. The present invention is designed to entirely eliminate this fault. This object is gained by the novel arrangement of the blades with respect to one another and with respect to the manner in which they engage and cut or shear the end face of the bearings.

In this instance the cutter head is provided with suitable blades for cutting the thrust face, and a fillet blade for cutting the fillet on the bearing ends. Certain blades are arranged tangentially with regard to the axis of the head, which in this instance would be the axis of the shaft supporting it, and, in some instances in order to reduce milling costs, the tangential blades may be placed in paired alignment to each other. When so arranged one of the blades shears toward the shaft and the other away therefrom. Other blades are radially disposed with regard to said shaft. This arrangement of the blades has been found to avoid any tendency to chatter. From the foregoing it will be seen that this invention has for its purpose the attainment of several objects, among which are the following.

One object of the invention is to provide a tool of this character that will not chatter.

Another object of the invention is to provide a tool of this character with tangentially disposed blades one of which will shear in one direction and the other of which will shear in a substantially opposite direction.

Other objects will become known upon reading the specification following, aided by the accompanying drawing, wherein:—

Figure I is a front elevation of the cutter head.

Fig. II is a side elevation of the head.

Fig. III is a fragmentary sectional view of a bearing and shows the application of the invention thereto.

Similar numerals refer to similar parts throughout the several views.

In the drawing, it will be seen that the tool comprises a cutter head 1, having a front or tool face 2 and a rear face 3. The rear face has an annular hub 4, which is provided with a bore or aperture 5 which bore continues through head 1. This bore serves for mounting the head upon a boring shaft, such as the shaft 6, to which it is held for rotation by a proper keying device such as a key entering the slot 7 in the hub 4, which being construction well known to those familiar with the art needs no further discussion. Projecting from the face 2 of the head are a number of cutter blades, and in this instance to simplify the description, but three are shown, 8, 9 and 10 respectively, each seated in a slot provided therefor in the head. Such blades are made of suitable material such as hardened steel, and each is provided with a suitably ground cutting or shearing edge, 8', 9' or 10' as the case may be. The width of the slots within which the blades seat is such that force must be exerted in order to compel the blades to seat therein, so that the blades, under normal conditions, are firmly held therein.

Particular attention is now called to the novel arrangement of the blades 8, 9 and 10 within the head 1. In this instance it will be seen that blade 8 is disposed in a manner that it intersects or extends into the bore 5 non-tangentially, and that blades 9 and 10 are arranged tangentially with regard thereto, and also that there is no regularity or equality of spacing between the blades. This irregularity of spacing the blades aids materially in preventing chatter and chatter marks upon the end face of the bearing which is being prepared for end thrust. However complete elimination of chatter is obtained by the disposition of blades 9 and 10 with respect to blade 8. It will be seen that these blades are tangentially arranged with regard to bore 5, and that they are in alignment with one another. However, it is to be understood that it is not necessary for the tangentially arranged blades to be in alignment with each other, it is merely done in this instance because it greatly simplifies the milling of the slots within which they are seated.

If the head 1, as shown in Figure I, rotates to the left or counter clockwise, blade 9 will shear toward the bore 5, and blade 10 will shear away therefrom. It will be seen that there is little likelihood of chatter, which is occasioned mostly by equally spaced radially disposed cutter blades. By this arrangement of the cutter blades chatter marks made by any one blade will not be intensified by the remaining blades, but to the contrary will be eliminated thereby.

In addition to the blades 8, 9, and 10, the head 1 is constructed to receive the adjustable filled cutter or blade 11. This blade is adjustably seated in the slot 12. The slot 12 is arranged so that blade 11 can be moved to and from the bore 5 in order to accommodate it to the varying sizes of bearings. Blade 11 is provided with a portion 13 for cutting the fillets on the bearings. Set screws 14 are threaded into the head from one side thereof and engage the blade 11 and when threaded up secure it against movement. This is, of course, done after it has been placed in a suitable position for filleting. Blades 9 and 10 are provided with beveled ends 15 and 16 respectively to allow them to conform to shaft 6.

Figure III shows the device in operation facing the bearing 17 which is held in the seat or saddle 18. This view also illustrates the fillet 19 cut by the blade 11. In this instance the device is being used to face the end of the bearing 17 for end thrust.

Having described my invention, what I declare as new and desire to secure by Letters Patent, is—

1. In a tool designed for cutting end thrust facings upon bearings, wherein such tool consists of a cutter head provided with a bore for mounting it upon a shaft and a face from which projects cutter blades, the arrangement of such cutter blades which consists in arranging certain of said blades tangentially with regard to said bore, and in alignment with regard to one another, and arranging other of said blades nontangentially with regard to said bore.

2. In a tool designed for cutting end thrust facings upon bearings, wherein such tool consists of a cutter head provided with a bore for mounting it upon a shaft and a face from which projects cutter blades, the arrangement of such cutter blades which consists in arranging two thereof tangentially with regard to said bore, arranging a third blade radially with regard to said bore, and providing an irregularity of spacing between such blades.

3. In a device of the character set forth, a cutter head provided with a bore for seating it upon a cutter shaft, said head being provided with a cutter face, a plurality of cutter blades seated in said head and projecting from said face, certain of said blades being positioned tangentially with regard to said bore, other of said blades being positioned radially with regard to said bore, and said head being provided with a slot opening out of the face thereof and extending toward and intersecting said bore, and constituting a seat for an adjustable fillet cutter.

ISAAC R. ROBISON.